US011465734B1

(12) United States Patent
Wiegman

(10) Patent No.: US 11,465,734 B1
(45) Date of Patent: Oct. 11, 2022

(54) SYSTEMS AND METHODS FOR DISTRUBUTED FLIGHT CONTROLLERS FOR REDUNDANCY FOR AN ELECTRIC AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/476,795

(22) Filed: Sep. 16, 2021

(51) Int. Cl.
| G01C 23/00 | (2006.01) |
| B64C 13/16 | (2006.01) |
| G06N 20/00 | (2019.01) |
| B64D 27/24 | (2006.01) |
| B64D 31/10 | (2006.01) |
| B64D 45/00 | (2006.01) |

(52) U.S. Cl.
CPC .............. *B64C 13/16* (2013.01); *B64D 27/24* (2013.01); *B64D 31/10* (2013.01); *B64D 45/00* (2013.01); *G06N 20/00* (2019.01); *B64D 2045/0085* (2013.01)

(58) Field of Classification Search
CPC ........ B64C 13/16; B64D 27/24; B64D 31/10; B64D 45/00; B64D 2045/0085; G06N 20/00; G01C 23/00
USPC .......................................................... 701/3
See application file for complete search history.

(56) References Cited

U.S. PATENT DOCUMENTS

| 4,472,780 | A | 9/1984 | Chenoweth |
| 4,649,484 | A | 3/1987 | Herzog |
| 5,493,497 | A | 2/1996 | Buus |
| 7,708,229 | B1 | 5/2010 | Angle, II |
| 7,840,316 | B2 | 11/2010 | Yount |
| 8,033,509 | B2 | 10/2011 | Yount |
| 9,586,693 | B1* | 3/2017 | Heinrich ................ B64D 45/00 |
| 10,901,434 | B2 | 1/2021 | Cutler et al. |
| 2004/0098140 | A1 | 5/2004 | Hess |
| 2006/0043242 | A1 | 3/2006 | Benson |
| 2006/0126608 | A1* | 6/2006 | Pereira ................ H04L 41/0866 370/360 |
| 2007/0007385 | A1 | 1/2007 | Potter |
| 2007/0008673 | A1 | 1/2007 | Finley |
| 2007/0153433 | A1 | 7/2007 | Sundquist |
| 2009/0018703 | A1 | 1/2009 | Mangalam |
| 2011/0180656 | A1 | 7/2011 | Shue |
| 2012/0290153 | A1 | 11/2012 | Olsoe |

(Continued)

*Primary Examiner* — Shardul D Patel
(74) *Attorney, Agent, or Firm* — Caldwell Intellectual Property Law

(57) ABSTRACT

A system for distributed flight controllers for an electric aircraft is provided. The system includes a plurality of flight components coupled to the electric aircraft, a first controller coupled to an electric aircraft, the first controller configured to receive a plurality of measured aircraft data and generate a controller allocation datum as a function of the plurality of measured aircraft data. The system further includes a plurality of second controllers, wherein each second controller is configured to receive the controller allocation datum from the first controller, generate an allocation command as a function of the controller allocation datum, and provide the allocation command to each flight component of the plurality of flight components.

20 Claims, 7 Drawing Sheets

(56) References Cited

U.S. PATENT DOCUMENTS

| | | | |
|---|---|---|---|
| 2013/0306787 A1 | 11/2013 | Marton | |
| 2014/0244218 A1* | 8/2014 | Greenberg | G06F 30/3323 |
| | | | 703/1 |
| 2014/0288731 A1* | 9/2014 | Hagerott | B64C 13/341 |
| | | | 701/3 |
| 2015/0160658 A1* | 6/2015 | Reedman | G05D 1/0088 |
| | | | 701/3 |
| 2016/0023755 A1* | 1/2016 | Elshafei | B64C 39/024 |
| | | | 244/17.23 |
| 2017/0138781 A1* | 5/2017 | Adibhatla | F02C 7/232 |
| 2017/0300065 A1* | 10/2017 | Douglas | B64C 29/0025 |
| 2020/0349390 A1* | 11/2020 | Konwar | G06N 20/00 |
| 2021/0053676 A1* | 2/2021 | Brand | B64D 27/24 |

* cited by examiner

SYSTEMS AND METHODS FOR DISTRUBUTED FLIGHT CONTROLLERS FOR REDUNDANCY FOR AN ELECTRIC AIRCRAFT

FIELD OF THE INVENTION

The present invention generally relates to the field of flight control. In particular, the present invention is directed to systems and methods for distributed flight controllers for redundancy for an electric aircraft.

BACKGROUND

Automated control is indispensable in operating an electric vehicle. Safety of an automated electric vehicle such as an electric aircraft is critical. Flight control system or autopilot program is paramount in operating an electric vehicle safely. An automated flight control system may require a form of redundancy to safeguard against failures. However, building redundancy in automated flight control systems may be complex or costly. In electrically propelled vehicles, such as an electric vertical takeoff and landing (eVTOL) aircraft, it is essential to maintain the integrity of the aircraft at all times during operation. In some flights, one or more actuators may experience a malfunction. In some flights, one or more computing devices controlling one or more actuators may experience a malfunction. The various systems of the electric aircraft are responsible for maintaining continuous operation in the event of one or more malfunctions.

SUMMARY OF THE DISCLOSURE

In an aspect, a system for distributed flight controllers for an electric aircraft is provided. The system includes a plurality of flight components coupled to the electric aircraft, a first controller coupled to an electric aircraft, the first controller configured to receive a plurality of measured aircraft data and generate a controller allocation datum as a function of the plurality of measured aircraft data. The system further includes a plurality of second controllers, wherein each second controller is communicatively coupled to each flight component of the plurality of flight components. Each second controller is configured to receive the controller allocation datum from the first controller, generate an allocation command as a function of the controller allocation datum, and provide the allocation command to each flight component of the plurality of flight components.

In another aspect, a method for distributed flight controllers for an electric aircraft is provided, the method includes receiving, by a first controller, a plurality of measured aircraft data, generating a controller allocation datum as a function of the plurality of measured aircraft data, receiving, by a second controller of a plurality of second controllers, the controller allocation datum from the first controller, generating an allocation command as a function of the controller allocation datum, and providing the allocation command to each flight component of the plurality of flight components.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for distributed flight controllers for redundancy for an electric aircraft. In an embodiment, aspects of the present disclosure can be used to distribute control and maintain consistent operation of an electric aircraft such as an electric vertical take-off and landing (eVTOL) aircraft. For example, a rotor may malfunction, but a second controller directly associated with that rotor may isolate itself and allow for a first controller to delineate control among a plurality of second controllers. In another example, each rotor of an electric aircraft may be controlled independently by an associated controller without interference from another controller. In another example, a second controller may malfunction in which the malfunctioning controller may disconnect itself from its associated flight component and a first controller may reconnect or re-associate that flight component to another second controller. Exemplary embodiments illustrating aspects of the present disclosure are described below in the context of several specific examples.

Aspects of the present disclosure can be used to automate redundancy of flight controllers for an electric aircraft. Aspects of the present disclosure can be used to control each flight component as a function of an individual controller. In some embodiments, each controller considers all flight components and calculates instructions for all flight components but controls only one actuator. The controller may be physically connected to only one flight components or one or more flight components. In the event a controller, only one actuator of the aircraft may be affected. The distributed flight control system may comprise a simple to implement and redundant autopilot hardware set-up.

Aspects of the present disclosure allow for distribution of controller control. A first controller may receive a plurality of data and normalize that data into computer readable instructions for each second controller controlling an associated flight component. First controller may generate multiple copies of the same instructions to be followed by a plurality of second controllers. First controller may generate unique instructions designed to be performed exclusively by individual second controllers. The first controller may disconnect or instruct one or more second controllers to disconnect from its associated flight component or another second controller.

Figure 1:
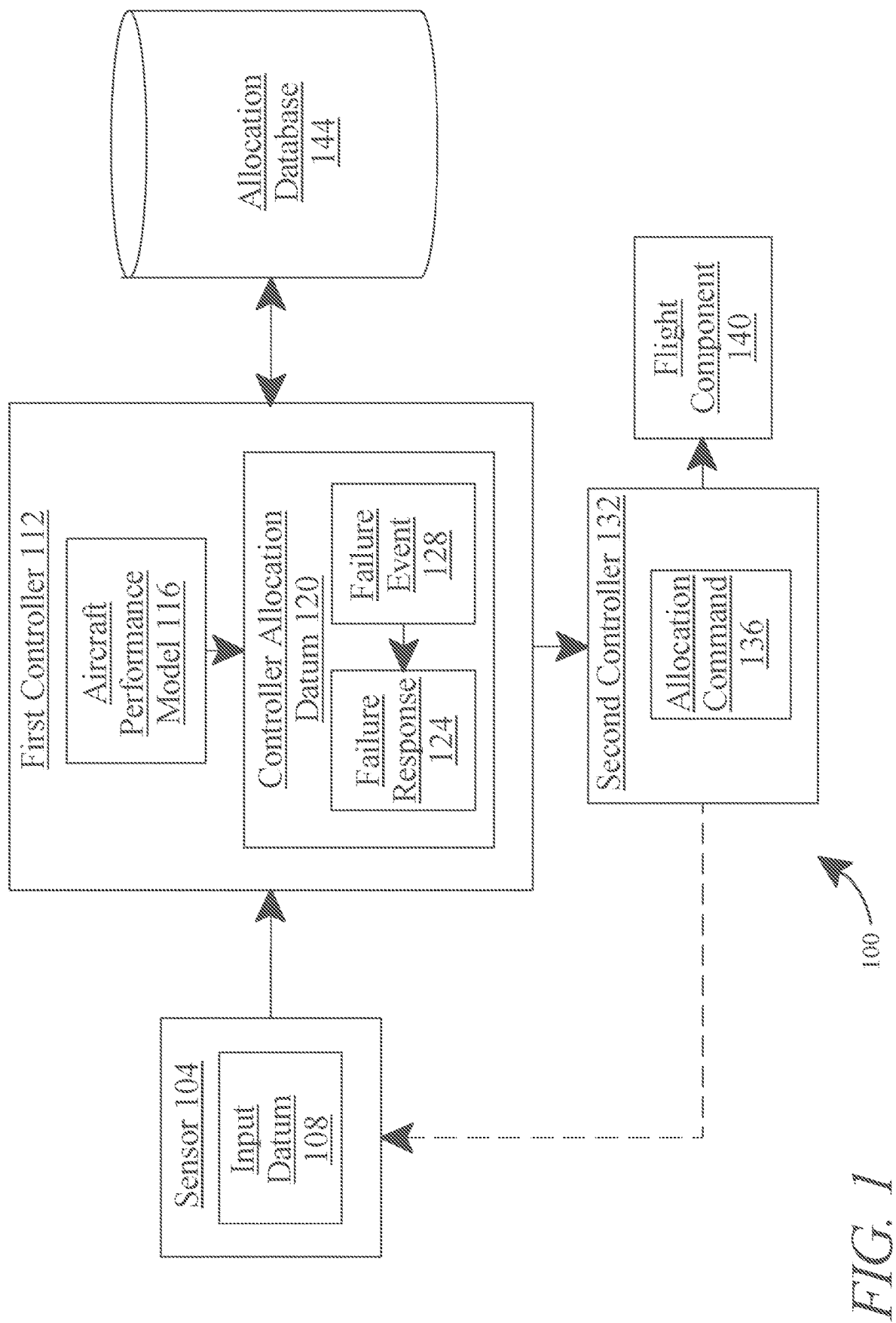
FIG. 1 is an exemplary embodiment of a systems for distributed flight controllers for redundancy for an electric aircraft.

Referring now to FIG. 1 is an exemplary embodiment of a systems for distributed flight controllers for redundancy for an electric aircraft. The system 100 includes a plurality of flight components coupled to the electric aircraft. "Coupled," for the purpose of this disclosure, is a link or connection of two electrical components. In a non-limiting embodiment, the electric aircraft may include a plurality of flight components physically attached to the body of the electric aircraft. In a non-limiting embodiment, the electric aircraft may include a plurality of flight components to be linked directly and/or indirectly through electrical signals. The system 100 further includes a first controller coupled to the electric aircraft. A "first controller," for the purpose of this disclosure, is a computing device used to control one or more computing devices. First controller 112 may include a flight controller, for instance and without limitation as described in further detail below. First controller 112 may include a computing device. computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously providing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

First controller 112 is configured to receive a plurality of measured aircraft data. First controller 112 may receive the plurality of measured aircraft data from sensor 104. One or more sensors may be communicatively connected to at least a pilot control, the manipulation of which, may constitute at least an aircraft command. "Communicative connecting", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to at least a sensor 104. A "sensor," for the purposes of this disclosure, refer to a computing device configured to detect, capture, measure, or combination thereof, a plurality of external and electric vehicle component quantities. Sensor 104 may be integrated and/or connected to at least an actuator, a portion thereof, or any subcomponent thereof. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 104 may include circuitry or electronic components configured to digitize, transform, or otherwise manipulate electrical signals.

With continued reference to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. Sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from the sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may target an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may include a measurement unit (IMU). The IMU may be an IMU as described herein. In a non-limiting embodiment, the IMU may be configured to detect at least an aircraft angle. At least an aircraft angle may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. In a non-limiting embodiment, the IMU may be configured to detect at least an aircraft angle rate. At least an aircraft angle rate 116 may include any information about the rate of change of any angle associated with an electrical aircraft as described herein. Any measurement system may be used in the description of at least an aircraft angle rate.

With continued reference to FIG. 1, sensor 104 may be configured to detect a plurality of measured aircraft data. A "measured aircraft data," for the purpose of this disclosure, is a datum or element of data describing parameters captured by a sensor describing the outside environment and physical values describing the performance or qualities of flight components of the electric aircraft. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 104 may include circuitry, computing devices, electronic components or a combination thereof that translates a plurality of datum into at least an electronic signal configured to be transmitted to another electronic component. The plurality of measured aircraft data may include a sensor datum. A "sensor datum," for the purpose of this disclosure, is any datum or element of data describing parameters captured by a sensor describing the outside environment and physical values describing the performance or qualities of flight components of the electric aircraft. In a non-limiting embodiment, the sensor datum may include any data captured by any sensor as described in the entirety of this disclosure. Additionally and alternatively, the sensor datum may include any element or signal of data that represents an electric aircraft route and various environmental or outside parameters. In a non-limiting embodiment, sensor datum may include an element of that representing the safest, most efficient, shortest, or a combination thereof, flight path. In a non-limiting embodiment, the sensor datum may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, the plurality of measured aircraft data may include a flight component state data. A "flight component state data," for the purposes of this disclosure, refer to any datum that represents the status or health status of a flight component or any component of an electric aircraft. The flight component state data of a plurality of flight components. "Flight components", for the purposes of this disclosure, includes components related to, and mechanically connected to an aircraft that manipulates a fluid medium in order to propel and maneuver the aircraft through the fluid medium. In a non-limiting embodiment, the flight components may include, but not limited to, rotors, a battery, vertical propulsors, forward pushers, landing gears, and the like thereof. The operation of the aircraft through the fluid medium will be discussed at greater length hereinbelow. The flight component state data may include a plurality of state information of a plurality of flight components of the electric aircraft. A state information of the plurality of state information of the plurality of aircraft components may include an aircraft flight duration, a distance of the aircraft flight, a plurality of distances of an aircraft from the surface, and the like. The flight component state data may denote a location of the aircraft, status of the aircraft such as health and/or functionality, aircraft flight time, aircraft on frame time, and the like thereof. The flight component state data may include aircraft logistics of an electric aircraft of a plurality of electrical aircraft.

With continued reference to FIG. 1, the plurality of measured aircraft data may include input datum 108. An "input datum," for the purpose of this disclosure, is a datum or element of data identifying and/or a pilot input or command. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. In a non-limiting embodiment, input datum may include an electrical signal. In a non-limiting embodiment, input datum may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into input datum 108 configured to be transmitted to any other electronic component.

With continued reference to FIG. 1, the plurality of measured aircraft data may include a flight datum. A "flight datum," for the purpose of this disclosure, is any datum or element of data describing physical parameters of individual actuators and/or flight components of an electric aircraft or logistical parameters of the electric aircraft. In a non-limiting embodiment, flight datum may include a plurality of data describing the health status of an actuator of a plurality of actuators. In a non-limiting embodiment, the plurality of data may include a plurality of failure data for a plurality of actuators. In a non-limiting embodiment, safety datum may include a measured torque parameter that may include the remaining vehicle torque of a flight component among a plurality of flight components. A "measured torque parameter," for the purposes of this disclosure, refer to a collection of physical values representing a rotational equivalence of linear force. A person of ordinary skill in the art, after viewing the entirety of this disclosure, would appreciate the various physical factors in measuring torque of an object. For instance and without limitation, remaining vehicle torque may be consistent with disclosure of remaining vehicle torque in U.S. patent application Ser. No. 17/197, 427 and titled "SYSTEM AND METHOD FOR FLIGHT CONTROL IN ELECTRIC AIRCRAFT", which is incorporated herein by reference in its entirety. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque. In a non-limiting embodiment, controller 112 may mix, refine, adjust, redirect, combine, separate, or perform other types of signal operations to translate pilot desired trajectory into aircraft maneuvers. In a nonlimiting embodiment a pilot may send a pilot input at a press of a button to capture current states of the outside environment and subsystems of the electric aircraft to be displayed onto an output device in pilot view. The captured current state may further display a new focal point based on that captured current state. In a non-limiting embodiment, controller 112 may condition signals such that they can be sent and received by various components throughout the electric vehicle. In a non-limiting embodiment, flight datum may include at least an aircraft angle. At least an aircraft angle may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. In a non-limiting embodiment, flight datum may include at least an aircraft angle rate. At least an aircraft angle rate may include any information about the rate of change of any angle associated with an electrical aircraft as described herein. Any measurement system may be used in the description of at least an aircraft angle rate.

With continued reference to FIG. 1, the plurality of measured aircraft data may include a controller datum. A "controller datum," for the purpose of this disclosure, is any datum or element of data describing the function, operation, and status of a plurality of controllers. In a non-limiting embodiment, controller datum may include a plurality of information denoting a second controller. In a non-limiting embodiment, first controller 112 may receive information about the health status of one or more second controllers 132. For example and without limitation, first controller 112 may determine which second controller 132 of a plurality of second controllers shows is operating properly or malfunctioning in order to convert the plurality of measured aircraft data to a set of instructions for each second controller 132. Persons skilled in the art, upon reviewing the entirety of this disclosure, will be aware of the various embodiments for receiving data and generating an instruction set as disclosed in the entirety of this disclosure.

With continued reference to FIG. 1, sensor 104 may be configured to transmit the plurality of measured aircraft data to first controller 112. In a non-limiting embodiment, first controller 112 and/or second controller 132 may include a plurality of physical controller area network buses communicatively connected to the aircraft and sensor 104. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. For instance and without limitation, CAN bus unit may be consistent with disclosure of CAN bus unit in U.S. patent application Ser. No. 17/218, 342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, first controller 112 and/or second controller 132 may receive the plurality of measured aircraft data sensor 104 by a physical CAN bus unit. In a non-limiting embodiment, the sensor 104 may include a physical CAN bus unit to detect the plurality of measured aircraft data in tandem with a plurality of individual sensors from a sensor suite. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units may be located physically at the aircraft may include mechanical connection to the aircraft, wherein the hardware of the physical CAN bus unit is integrated within the infrastructure of the aircraft.

In a non-limiting embodiment, first controller 112 may be responsible only for mapping the pilot inputs such as input datum, attitude such as at least an aircraft angle, and body angular rate measurement such as at least an aircraft angle rate to motor torque levels necessary to meet the input datum. In a non-limiting exemplary embodiment, first controller 112 may include the nominal attitude command (ACAH) configuration, first controller 112 may make the vehicle attitude track the pilot attitude while also applying the pilot-commanded amount of assisted lift and pusher torque which may be encapsulated within control allocation datum 120. The flight controller is responsible only for mapping the pilot inputs, attitude, and body angular rate measurements to motor torque levels necessary to meet the input datum. In the nominal attitude command (ACAH) configuration, first controller 112 makes the vehicle attitude track the pilot attitude while also applying the pilot commanded amount of assisted lift and pusher torque. In a non-limiting embodiment, first controller 112 may include the calculation and control of avionics display of critical envelope information i.e., stall warning, vortex ring state, pitch limit indicator, angle of attack, transition envelopes, etc. In a non-limiting embodiment, first controller 112 may calculate, command, and control trim assist, turn coordination, pitch to certain gravitational forces, automation integration: attitude, position hold, LNAV, VNAV etc., minimum hover thrust protection, angle of attack limits, etc., precision Autoland, other aspects of autopilot operations, advanced perception of obstacles for 'see and avoid' missions, and remote operations, among others.

With continued reference to FIG. 1, first controller 112 may be configured to generate controller allocation datum 120 as a function of at least the plurality of measured aircraft data. In a non-limiting embodiment, first controller 112 may include an outer loop controller. In a non-limiting embodiment, first controller 112 may include an inner loop controller. In a non-limiting embodiment, outer loop controller may include one or more computing devices consistent with this disclosure and/or one or more components and/or modules thereof. For instance and without limitation, the outer loop controller may be consistent with outer loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. The outer loop controller may be implemented using a microcontroller, a hardware circuit such as an FPGA, system on a chip, and/or application specific integrated circuit (ASIC). The outer loop controller may be implemented using one or more analog elements such as operational amplifier circuits, including operational amplifier integrators and/or differentiators. The outer loop controller may be implemented using any combination of the herein described elements or any other combination of elements suitable therefor. The outer loop controller may be configured to input one or more parameters, such as input datum 108 and/or at least an aircraft angle and output rate setpoint. The outer loop controller may periodically detect one or more errors between aircraft angles and commanded angles in any one of pitch, roll, yaw, or a combination thereof. For example, and without limitation, the outer loop controller may detect the error between the commanded and detected aircraft angle and command one or more propulsors and or flight components consistent with the entirety of this disclosure to reduce said error in one or more iterations. The outer loop controller may be closed by a PI controller with integral anti-windup via back-calculation. Additional logic is present to prevent integral windup while grounded on a not perfectly level surface. Gains may be reduced at large amplitude in order to reduce overshoot on large inputs. This excessive overshoot may be due in part to linear systems having constant percent overshoot, so at larger amplitudes, the absolute value of the overshoot becomes (potentially unacceptably) large. Additionally, on large step inputs, motor saturation (a nonlinear effect) may occur for extended periods of time and causes overshoot to increase. In extreme cases, the occurrence of motor saturation without any gain reduction may lead to unrecoverable tumbles. This gain reduction may be implemented as a (soft) rate command limit. In particular, this reduction may be given by the piecewise combination of a linear function and the square root function. Note that the input/output relationship may be monotonically increasing, so increased angle error or integral action always makes it through to the inner loop, even if the gain reduction may be engaged. For inputs less than the knee, set to 20 deg/s, the input may be not changed. Above the knee, the output may be given by sign(input)*sqrt(abs(input)*knee). The effective gain at any point to the right of the knee may be then given by sqrt(abs(input)*knee)/input. This gain decrease at large amplitudes has been shown in simulation to stabilize the vehicle when subject to inputs that would otherwise destabilize the vehicle into an unrecoverable tumble. For the vast majority of maneuvers, this soft rate limit may be set high enough to not be noticeable.

With continued reference to FIG. 1, a "controller allocation datum," for the purpose of this disclosure, is a datum or element of data that describes a plurality of instructions and/or commands for one or more second controllers 132. In a non-limiting embodiment, first controller 112 may receive the plurality of measured aircraft data and convert the plurality of measured aircraft data into controller allocation datum 120, wherein first controller 112 may analyze the data surrounding the outside environment, one or more second controllers 132, one or more flight components 132 associated and/or designated to one second controller 132, and the like thereof, and generate controller allocation datum 120 which may include individual controller allocation datum uniquely designed for each second controller 132 and/or its associated flight component 140. For example and without limitation, first controller 112 may detect a malfunctioning flight component 140 and its performance output and generate a controller allocation datum specifically instructing the second controller associated with that malfunctioning flight component to isolate and/or disconnect itself from other second controllers. For example and without limitation, first controller 112 may detect another flight component 140 with greater maximum performance capacity and generate a controller allocation datum that includes a specific controller allocation datum instructing the second controller associated with flight component 140 to increase torque output of the flight component by 30% and in order to alter the angle of attack of the electric aircraft and compensate for the malfunctioning flight component. In a non-limiting embodiment, first controller 112 may detect abnormal behavior of a second controller. For example and without limitation, first controller 112 may be configured to receive constant signals from a second controller and may conclude the second controller is malfunctioning if it fails to transmit a consistent stream of signals. For example and without limitation, first controller 112 may generate a controller allocation datum that includes a specific controller allocation datum instructing the malfunctioning second controller to disconnect itself from its associated flight component and other functioning second controllers. For example and without limitation, the controller allocation datum may include a specific controller allocation datum instructing the other functioning second controllers to disconnect itself from the malfunctioning second controller and instruct one functioning second controller to activate a connection with the flight component associated with the malfunctioning second controller in which the flight component may be commanded by the newly connected second controller. Persons skilled in the art, upon reviewing the entirety of this disclosure, will be aware of the various embodiments of delineating control and instructions as disclosed in the entirety of this disclosure.

With continued reference to FIG. 1, controller allocation datum 120 may include failure response 124 as a function of failure event 128. In a non-limiting embodiment, first controller 112 may allocate control between second controllers 132 as a function of control allocation datum 120 and failure response 124. A "failure response," for the purpose of this disclosure, is a controller allocation datum that includes a plurality of instructions and/or commands to resolve failure event 128. A "failure event," for the purpose of this disclosure, is the event of a failure, abnormality, malfunction, or combination thereof, of an electrical component such as, but not limited to, second controller 132 and flight component 140. In a non-limiting embodiment, failure event 128 may include a malfunction of a rotor, forward pusher, propeller, battery, and the like thereof. For example and without limitation, failure event 128 may include an instance of a flight component being damaged or detached from the overall body of the electric aircraft during flight. In a non-limiting embodiment, failure response 124 may include a set of instructions of controller allocation datum 120 configured to compensate for instance of failure event 128. For example and without limitation, failure response 124 may include instructions for remaining flight components to adjust its performance output to maintain stable and steady flight of the electric aircraft to compensate for a malfunctioning flight component. In a non-limiting embodiment, failure response 124 may include an output of alerts and/or sirens indicating an emergency situation. In a non-limiting embodiment, failure response 124 may include an automatic transmission of emergency to be received by other entities including an air traffic control. Persons skilled in the art, upon reviewing the entirety of this disclosure, will be aware of the various responses as a trigger of a failure event as disclosed in the entirety of this disclosure.

With continued reference to FIG. 1, first controller 12 may be configured to generate failure response 124 as a function of aircraft performance model 116. In a non-limiting embodiment, aircraft performance model 116 may include a model depicting the performance of the aircraft in which one or more of the actuators are malfunctioning or failing. In a non-limiting embodiment, aircraft performance model 116 may be generated during a flight or after a flight has occurred. For example and without limitation, aircraft performance model 116 may depict the performance of the aircraft and the aircraft actuators in real time as it is flying in the air. In a non-limiting embodiment, aircraft performance model 116 may include a depiction of the flight of the aircraft. In a non-limiting embodiment, aircraft performance model 116 may include a plurality of performance parameters include, but not limited to, aircraft velocity, attitude, actuator torque output, and the like thereof. In a non-limiting embodiment, aircraft performance model 116 may highlight an abnormality of an actuator and a plurality of performance parameters associated with that abnormal actuator. Persons skilled in the art, upon reviewing the entirety of this disclosure, will be aware of the various embodiments of a simulation and/or model in the context of visualization and analysis consistent with this disclosure.

With continued reference to FIG. 1, aircraft performance model 116 may include an expected aircraft performance model. An "expected aircraft performance model," for the purpose of this disclosure, is any actuator performance model of the aircraft that embodies an ideal or expected analytical and/or interactive visualization regarding aircraft operation and/or performance capabilities. In a non-limiting embodiment, the expected aircraft performance model may include an actuator performance model that depicts a performance model in which none of the actuators are malfunctioning. For example and without limitation, the expected aircraft performance model may be a model depicting a performance of what the aircraft should be based on the ideal, expected, or initial performance the aircraft actuators are intended to perform. For example and without limitation, the expected aircraft performance model includes peak performance output including, but not limited to, power consumption, maximum torque output, cruising torque output, maximum attitude, cruising attitude, maximum velocity, cruising velocity, and the like thereof. For example and without limitation, the expected aircraft performance model may highlight individual performance parameters of each actuator based on a sensor disposed on each actuator. In a non-limiting embodiment, the expected aircraft performance model can be used to assess the performance of the aircraft actuators by comparing the expected aircraft performance model to aircraft performance model 116 and analyzing the difference between the data from the two models. In a non-limiting embodiment, first controller 112 may aircraft performance model 116 the ideal and/or peak performance parameters of an aircraft and its flight components to simulate the expected aircraft performance model based on those ideal and/or peak performance parameters. In a non-limiting embodiment, the expected aircraft performance model may include a plurality of the expected aircraft performance model depicting a different failure modes of an aircraft and/or an aircraft's actuators. For example and without limitation, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. Persons skilled in the art, upon reviewing the entirety of this disclosure, will be aware of the various models and comparisons consistent with this disclosure.

With continued reference to FIG. 1, aircraft performance model 116 may be generated as a function of a flight simulator. A "flight simulator" is a program or set of operations that simulate flight. For instance and without limitation, flight simulator may be consistent with flight simulator in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some cases, a flight simulator may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, a flight simulator may model an artificial and/or virtual aircraft in flight as well as an environment in which the artificial and/or virtual aircraft flies. In some cases, a flight simulator may include one or more physics models, which represent analytically or through data-based, such as without limitation machine-learning processes, physical phenomenon. Physical phenomenon may be associated with an aircraft and/or an environment. For example, some versions of a flight simulator may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator may include models representing fluid dynamics. For example, in some embodiments, flight simulator may include a representation of turbulence, wind shear, air density, cloud, precipitation, and the like. In some embodiments, flight simulator may include at least a model representing optical phenomenon. For example, flight simulator may include optical models representative of transmission, reflectance, occlusion, absorption, attenuation, and scatter. Flight simulator may include non-analytical modeling methods; for example, the flight simulator may include, without limitation, a Monte Carlo model for simulating optical scatter within a turbid medium, for example clouds.

With continued reference to FIG. 1, aircraft performance model 116 may include a virtual representation. The virtual representation may represent a virtualization of aircraft performance model 116 and/or the expected actuator performance model. A "virtual representation" includes any model or simulation accessible by computing device which is representative of a physical phenomenon, for example without limitation at least an actuator. For instance and without limitation, virtual representation may be consistent with virtual representation in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some cases, virtual representation may be interactive with flight simulator 116. For example, in some cases, data may originate from virtual representation and be input into flight simulator 116. Alternatively or additionally, in some cases, the virtual representation may modify or transform data already available to flight simulator 116. The virtual representation may include an electric aircraft and/or one or more actuator of the electric aircraft. In some cases, at least electric aircraft may include an electric vertical take-off and landing (eVTOL) aircraft, for example a functional flight-worthy eVTOL aircraft. In some cases, at least a virtual representation may include a virtual controller area network. Virtual controller area network may include any virtual controller area network. A controller area network may include a plurality of physical controller area network buses communicatively connected to the aircraft, such as an electronic vertical take-off and landing (eVTOL) aircraft as described in further detail below. A physical controller area network bus may be vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units located physically at the aircraft may include mechanical connection to the aircraft, wherein the hardware of the physical CAN bus unit is integrated within the infrastructure of the aircraft. Physical CAN bus units may be communicatively connected to the aircraft and/or with a plurality of devices outside of the aircraft.

With continued reference to FIG. 1, first controller 112 may be configured to identify a defunct component of the electric aircraft as a function of the plurality of measured aircraft data and the actuator performance model. A "defunct component," for the purpose of this disclosure, is a malfunctioning or failing electric component of an electric aircraft. In a non-limiting embodiment, the defunct component may include any electrical component that may produce abnormal outputs. For example and without limitation, the defunct component may include a defunct rotor that may output a torque of 1.5 Newton-metre (Nm) while the remaining rotors may output a torque of 3.6 Nm. In a non-limiting embodiment, actuators may include different failure modes which are represented by various expected actuator performance model 120. For example, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. In a non-limiting embodiment, first controller 112 may compare aircraft performance model 116 with an expected actuator performance model to identify a defunct component. For example and without limitation, first controller 112 may sort models based on their expected metrics and select the model that has expected metrics that closely match actual or observed metrics. In one example, the metrics compared include attitude and rates of change in attitude of the aircraft. In some embodiments, first controller 112 may compares observed metrics of the aircraft to expected metrics of the aircraft in an operable mode (e.g. no actuator failures associated with a "no failure" model). In a non-limiting embodiment, first controller 112 may receive from a flight simulator, a plurality of expected actuator performance model which may include a model for every possible failure mode. A "failure mode," for the purpose of this disclosure, is any state of the electric aircraft in which one or more actuators are defunct, malfunctioning, or failing. For example and without limitation, in an aircraft comprising four rotors, a model is determined for a first rotor failure, a second rotor failure, a third rotor failure, a fourth rotor failure, a first and second rotor failure, a first and third rotor failure, a first and fourth rotor failure, a second and third rotor failure, and a second and fourth rotor failure. Multiple additional models may be determined including a model for no rotor failure and all rotor failure in addition to a first, second, and third rotor failure and a second, third, and fourth rotor failure. In some embodiments, the number of models determined is equal to the number of actuators squared plus one. In some embodiments, the number of considered failure modes is less than the total possible failure modes. For example, models may not be determined for less likely failure modes in order to limit computations performed. Persons skilled in the art, upon reviewing the entirety of this disclosure, will be aware of various embodiments of failure modes used to identify the defunct component consistent with this disclosure. In a non-limiting embodiment, the plurality of expected actuator performance model may be sorted based on similarity to an observed flight datum. For example, an expected flight datum including expected attitude and expected attitude rate given a failure mode is determined or otherwise generated based on and/or for each model. In some embodiments, the models are sorted based on how closely their corresponding expected attitude and expected attitude rate matches the observed attitude and attitude rate. The sorted models may result in a sorted list of failure modes from most likely to least likely. For example, in the event a first rotor failure mode has a corresponding expected attitude that is 0.2 off from the observed attitude and an expected attitude rate that is 0.1 off from the observed attitude rate whereas a second rotor failure mode has a corresponding expected attitude that is 0.7 off from the observed attitude and an expected attitude rate that is 0.9 off from the observed attitude, the first rotor failure is determined to be more likely than the second rotor failure mode. In some embodiments, the summation of the difference between expected attitude and observed attitude and the difference between expected attitude rate and observed attitude rate is used to sort the models. In some embodiments, expected attitude is weighted more than expected attitude rate or vice versa. A model's similarity to observed metrics may be determined using various calculations based on the expected and observed values in various embodiments. In a non-limiting embodiment, first controller 112 may identify the defunct component or one or more defunct components based on the sorted model. For example, the failure mode top of the sorted list may be selected. Flight components failures that correspond to the failure mode are determined to be in effect.

With continued reference to FIG. 1, controller allocation datum 120 may be configured to be generated as a function of a machine-learning algorithm. For instance, and without limitation, first controller 112 may be configured to generate a machine-learning model. The machine-learning model may include any trained machine-learning model (e.g. a classifier) trained by a training data and configured to receive the plurality of measured aircraft data as an input and output control allocation datum 120 as a function of the training data. The training data may include any datum retrieved from allocation database 144. In a non-limiting embodiment, the training data may include a plurality of entries including, but not limited to, a previously stored aircraft data in which a previously stored controller allocation datum is correlated to an element of an aircraft model. An "element of aircraft model," for the purpose of this disclosure, is any aircraft model that may classify a pilot input correlated to a corresponding aircraft performance model. In a non-limiting embodiment, first controller 112 may use the training data from allocation database 144 to generate the machine-learning model as a function of a supervised machine-learning algorithm in which the machine-learning model may use the training data and the aircraft data as an input and output controller allocation datum 120. In a non-limiting embodiment, the training data may include a pilot input correlated to a model denoting a malfunction of a flight component. Machine-learning algorithm, without limitation, a linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, system 100 further includes a second controller 132 of a plurality of second controllers wherein each second controller is communicatively coupled to flight component 140. A "second controller," for the purpose of this disclosure, is any controller, flight control, computing device, and the like thereof, configured to receive instructions from first controller 112 and execute those instructions on one or more flight components 140. Second controller 132 may include any controller as described in the entirety of this disclosure. In a non-limiting embodiment, second controller 132 of a plurality of second controllers may be communicatively coupled to each flight component 140 of the plurality of flight components. In a non-limiting embodiment, each second controller may be associated with a respective flight component 140. For example and without limitation, a second controller may be assigned to one or more flight components exclusively. Second controller 132 may be configured to receive controller allocation datum 120 from the first controller 112. In a non-limiting embodiment, virtual CAN bus unit may be configured to demultiplex an incoming transmission signal into a plurality of outgoing messages originating from the plurality of physical controller area network buses. An outgoing message may be a demultiplexed transmission signal which originated as part of an incoming transmission signal. Outgoing message may include a plurality of data, and/or discrete portions thereof. Outgoing message may include analogue and/or digital transmission signals, including ethernet transmission signal and/or RF transmission signal. Demultiplexing may include extracting original channels on a receiving end to identify which physical CAN bus unit a signal originates from. Demultiplexing may be performed using a demultiplexer such as a binary decoder, or any programmable logic device. Demultiplexing may be performed using a computing software operating on the virtual CAN bus unit, which may deconvolute a signal. Alternatively or additionally, virtual CAN bus unit may be configured to communicatively connect to each controller area network gateway of a plurality of controller area network gateways. Virtual CAN bus unit may receive signal transduction directly from CAN network gateways, circumventing the need for multiplexing.

With continued reference to FIG. 1, second controller 132 may be configured to generate allocation command 136 as a function of controller allocation datum 120. An "allocation command," for the purpose of this disclosure, is a specific command of controller allocation datum 120 assigned to each second controller. In a non-limiting embodiment, allocation command 136 may include a specific instruction set from controller allocation datum 120 which may instruct second controller 132 associated with flight component 140 to increase torque output of the flight component by 30% and in order to alter the angle of attack of the electric aircraft and compensate for the malfunctioning flight component. In a non-limiting embodiment, second controller 132 may generate allocation command 136 that includes a specific set of instructions that instruct second controller 132 to disconnect itself from its associated flight component 140 and other functioning second controllers in the instant second controller 132 is deemed to be malfunctioning. For example and without limitation, allocation command 136 may include a specific set of instructions that instruct second controller 132 to disconnect itself from a malfunctioning second controller and activate a connection with the flight component associated with the malfunctioning second controller in which the flight component may be commanded by the newly connected second controller 132. Persons skilled in the art, upon reviewing the entirety of this disclosure, will be aware of the various embodiments of delineating control and instructions as disclosed in the entirety of this disclosure. With continued reference to FIG. 1, system 100 may include an allocation database 144. An "allocation database," for the purpose of this disclosure, is any database and/or data storage system configured to store/receive any datum or data related to controller allocation datum 120. In a non-limiting embodiment, allocation database 144 may be configured to store/retrieve the plurality of measured aircraft data in a database.

With continued reference to FIG. 1, first controller 112 may be configured to generate the aircraft controller allocation datum 120 as a function of allocation database 144. A plurality of measured aircraft data may be stored and/or retrieved in allocation database 144. The plurality of measured aircraft operation datum, which may be used for generating a training data, may also be stored and/or retrieved from allocation database 144. Flight controller 120 may receive, store, and/or retrieve the training data, the plurality of measured aircraft data, and the like, from allocation database 144. Flight controller 120 may store and/or retrieve machine-learning models, classifiers, among other determinations, I/O data, heuristics, algorithms, and the like, from allocation database 144. Allocation database 144 may be implemented, without limitation, as a relational database, a key-value retrieval database such as a NOSQL database, or any other format or structure for use as a database that a person skilled in the art would recognize as suitable upon review of the entirety of this disclosure. Allocation database 144 may alternatively or additionally be implemented using a distributed data storage protocol and/or data structure, such as a distributed hash table and the like. Allocation database 144 may include a plurality of data entries and/or records, as described above. Data entries in allocation database 144 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure.

With continued reference to FIG. 1, allocation database 144 may include, without limitation, measured aircraft data table, aircraft performance model table, failure response table, and/or controller allocation datum table. Allocation database 144 may include a heuristic table. Determinations by a machine-learning process, machine-learning model, ranking function, and/or classifier, may also be stored and/or retrieved from the allocation database 144. As a non-limiting example, allocation database 144 may organize data according to one or more instruction tables. One or more allocation database 144 tables may be linked to one another by, for instance in a non-limiting example, common column values. For instance, a common column between two tables of allocation database 144 may include an identifier of a submission, such as a form entry, textual submission, accessory device tokens, local access addresses, metrics, and the like, for instance as defined herein; as a result, a search by first controller 112 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Continuing in reference to FIG. 1, in a non-limiting embodiment, one or more tables of allocation database 144 may include, as a non-limiting example, measured aircraft data table, which may include categorized identifying data, as described above, including a plurality of measured aircraft data including input datum, sensor datum, flight datum, and the like. Measured aircraft data table may include, but not limited to, input datum, flight datum, sensor datum, outside parameters, and the like, categories, and may include linked tables to mathematical expressions that may describe the result and process of each maintenance or maintenance schedule. One or more tables may include, without limitation, a heuristic table, which may organize rankings, scores, models, outcomes, functions, numerical values, scales, arrays, matrices, and the like, that represent determinations, probabilities, metrics, parameters, values, standards, indexes, and the like, include one or more inputs describing potential mathematical relationships, as described herein. In a non-limiting embodiment, first controller 112 may retrieve an input datum and/or measured aircraft data from allocation database 144 which may be used as an input for the generation of the aircraft performance model output 136.

Continuing in reference to FIG. 1, in a non-limiting embodiment, one or more tables of allocation database 144 may include, as a non-limiting example, an aircraft performance model table, which may include categorized identifying data, as described above, including, but not limited to, a plurality of models, expected aircraft performance models, virtual representations, and the like. Flight plan table may include flight plan categories according type of failure or aircraft the model is depicting, and the like, categories, and may include linked tables to mathematical expressions that describe the impact of each alternative flight plan. In a non-limiting embodiment, first controller 112 may retrieve a flight plan from the allocation database 144 to generate controller allocation datum 120.

Continuing in reference to FIG. 1, in a non-limiting embodiment, one or more tables of allocation database 144 may include, as a non-limiting example, a failure response table, which may include categorized identifying data, as described above, including a different types of failure responses, models associated with a type of response, specific controller allocation datum associated with a specific failure response, and the like thereof. The failure response table may include three dimensional modeling of a flight, a two dimensional modeling of a flight, and the like, and may include linked tables to mathematical expressions that describe the impact of each flight simulation. Flight simulation table may include simulation of flight mimicking a plurality of incidences that may occur during a flight.

Incidences may include an electric aircraft malfunction, a pilot or passenger complaint, an issue corresponding a flight of the electric aircraft, and the like thereof. In a non-limiting embodiment, the flight controller 120 may retrieve one or more flight simulations from the allocation database 144 which may be used as an input for the generation of controller allocation datum 120.

Continuing in reference to FIG. 1, in a non-limiting embodiment, one or more tables of allocation database 144 may include, as a non-limiting example, a controller allocation datum table, which may include categorized identifying data, as described above, including, but not limited to, a plurality of controller allocation datums, a plurality of instructions for specific second controllers and specific failure events, and the like. Flight plan table may include flight plan categories according type of failure or aircraft the model is depicting, and the like, categories, and may include linked tables to mathematical expressions that describe the impact of each alternative flight plan. In a non-limiting embodiment, first controller 112 may retrieve a flight plan from the allocation database 144 to generate controller allocation datum 120.

Further referring to FIG. 1, allocation database 144 may include, without limitation, a heuristic table. Determinations by a machine-learning process, machine-learning model, ranking function, and/or classifier, may also be stored and/or retrieved from the allocation database 144. As a non-limiting example, allocation database 144 may organize data according to one or more instruction tables. One or more allocation database 144 tables may be linked to one another by, for instance in a non-limiting example, common column values. For instance, a common column between two tables of allocation database 144 may include an identifier of a submission, such as a form entry, textual submission, accessory device tokens, local access addresses, metrics, and the like, for instance as defined herein; as a result, a search by first controller 112 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables. In a non-limiting embodiment, flight plans may be generated manually by a pilot in any moment and the flight plans may be stored in the allocation database 144 or transmitted from a separate entity such as a remote device.

With continued reference to FIG. 1, second controller 132 of a plurality of second controllers is configured to perform allocation command 136 on its associated flight component 140 as a function of a torque allocation. In a non-limiting embodiment, allocation command 136 may include a command for a torque allocation to be applied to one or more actuators of the electric aircraft. In a non-limiting embodiment, allocation command 136 may include unique torque allocations for each actuator. For example and without limitation, allocation command 136 may instruct each functioning actuator to allocate a torque output of 4 Nm and instruct defunct actuator 128 to allocate a torque output of 0.4 Nm. For example and without limitation, allocation command 136 may instruct one or more defunct flight components to command a torque of 0 Nm and the remaining functioning actuators a torque of 6 Nm. In a non-limiting embodiment, allocation command 136 may be generated as a function of a torque allocation. For instance and without limitation, torque allocation may be consistent with the description of torque allocation in U.S. patent application Ser. No. 17/197,427 filed on Mar. 10, 2021 and titled, "SYSTEM AND METHOD FOR FLIGHT CONTROL IN ELECTRIC AIRCRAFT", which is incorporated herein in its entirety by reference. In a non-limiting embodiment, second controller 132 may generate allocation command 136 as a function of a machine-learning model. In a non-limiting embodiment, machine-learning model may generate allocation command 136 given controller allocation datum 120, aircraft performance model 116, and/or identification of defunct flight component and data describing it as inputs. Additionally and alternatively, second controller 132, as used herein, may be described as providing "control allocation" or "torque allocation". For example, mixer may take in commands to alter aircraft trajectory that requires a change in pitch and yaw. Mixer may allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure.

Figure 2:
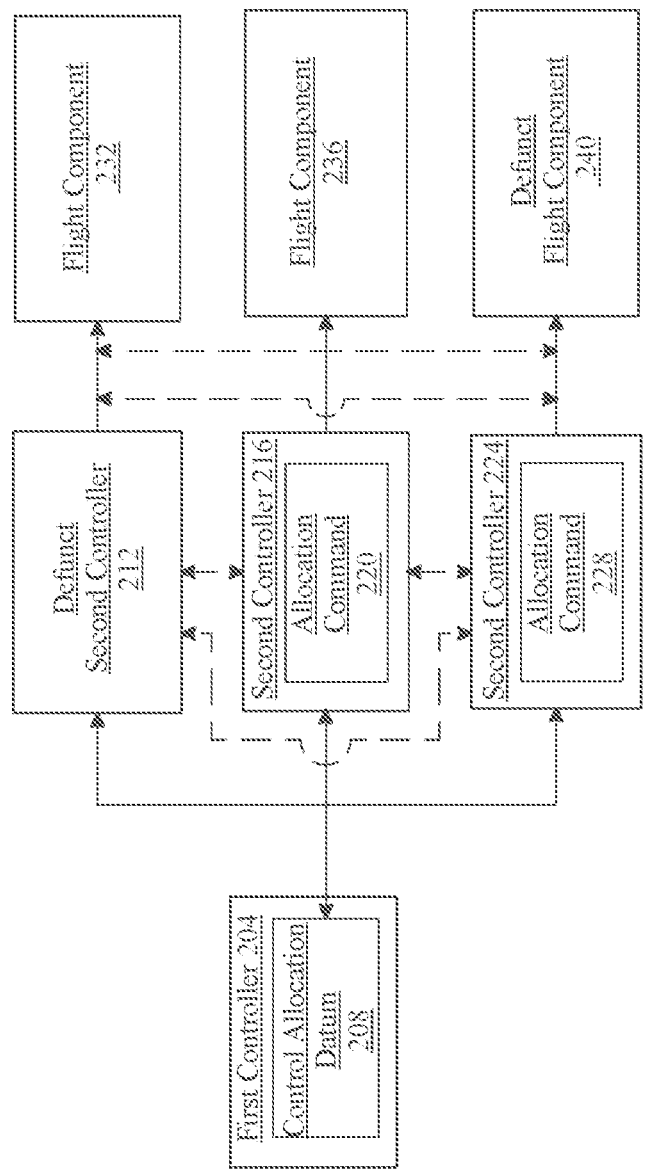
FIG. 2 is an exemplary embodiment of a redundant distributed flight controllers.

Now referring to FIG. 2, an exemplary embodiment of a system 200 of a redundant distributed flight controllers is presented. System 200 may include first controller 204 which may include controller allocation datum 208. First controller 204 may include any first controller as described herein. In a non-limiting embodiment, first controller 204 may detect defunct second controller 212 and data describing it and generate and/or modify control allocation datum 208 with consideration of defunct second controller 212. A "defunct second controller," for the purpose of this disclosure, is any malfunction, failure, or abnormality of any second controller. In a non-limiting embodiment, first controller 204 may generate control allocation datum 208 that may instruct defunct second controller 212 to disconnect itself from its associated flight component 232 and remaining second controllers such as second controller 216 and second controller 224. For example and without limitation, controller allocation datum 208 may further instruct second controller 216 to active a connection with flight component 232, and control both flight component 232 and flight component 236. For example and without limitation, second controller 216 may generate allocation command 220 to increase torque output of flight component 232 by 50% and reduce torque output of flight component 236 by 30%. In a non-limiting embodiment, allocation command 220 may instruct flight component 232 to output short bursts of torque to maintain a consistent torque output along with flight component 236 to avoid burnout by second controller 216. Persons skilled in the art, upon reviewing the entirety of this disclosure, will be aware of the various instructions for compensation of defunct second controller as disclosed in the entirety of this disclosure.

With continued reference to FIG. 2, first controller 204 may detect defunct flight component 240 and generate control allocation datum 208 to compensate for the malfunctioning flight component. In a non-limiting embodiment, controller allocation datum 208 may include a set of instructions instructing second controller 224, which is the controller associated with defunct flight component 240, to disconnect from defunct flight component 240. In a non-limiting embodiment, the set of instructions may instruct second controller 224 to isolate itself and disconnect from remaining second controllers such as second controller 216. In a non-limiting embodiment, the set of instructions may instruct second controller 216 to compensate for defunct flight component 240 and second controller 216 may generate allocation command 220 which may include increasing torque output of flight component 236 by 50% to compensate for defunct flight component 240 and maintain operation of flight of an electric aircraft. Persons skilled in the art, upon reviewing the entirety of this disclosure, will be aware of the various combination of events in quality control of components of an electric aircraft as described in the entirety of this disclosure.

Figure 3:
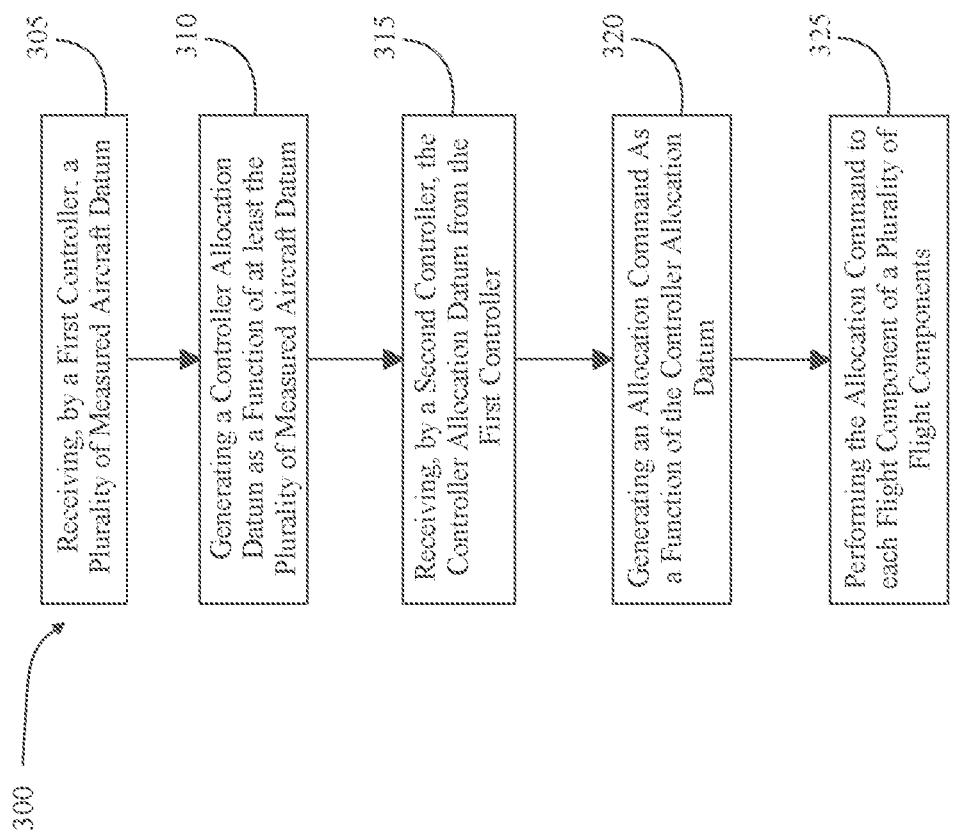
FIG. 3 is a flow diagram of an exemplary method for distributed flight controllers for redundancy for an electric aircraft.

Referring now to FIG. 3, a flow diagram of an exemplary method 300 for distributed flight controllers for redundancy for an electric aircraft is presented. Method 300, at step 305, includes receiving, by a first controller, a plurality of measured aircraft data. First controller may include any first controller as described herein. The plurality of measured aircraft data may include any plurality of measured aircraft data as described herein. step 305 may include receiving the plurality of measured aircraft data from a sensor. Sensor may include any sensor as described herein. One or more sensors may be communicatively connected to at least a pilot control, the manipulation of which, may constitute at least an aircraft command. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch.

With continued reference to FIG. 3, step 305 may include receiving a flight component state data. Flight component state data may include any flight component state data as described herein. In a non-limiting embodiment, the flight component state data of a plurality of flight components. The operation of the aircraft through the fluid medium will be discussed at greater length hereinbelow. The flight component state data may include a plurality of state information of a plurality of flight components of the electric aircraft. A state information of the plurality of state information of the plurality of aircraft components may include an aircraft flight duration, a distance of the aircraft flight, a plurality of distances of an aircraft from the surface, and the like. The flight component state data may denote a location of the aircraft, status of the aircraft such as health and/or functionality, aircraft flight time, aircraft on frame time, and the like thereof. The flight component state data may include aircraft logistics of an electric aircraft of a plurality of electrical aircraft. Step 305 may include receiving an input datum. Input datum may include any input datum as described herein. In a non-limiting embodiment, at least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. Step 305 may include receiving a flight datum. Flight datum may include any flight datum as described herein. Persons skilled in the art, upon reviewing the entirety of this disclosure, will be aware of the various inputs and external parameters to be measured, received, detected, or captured as disclosed in the entirety of this disclosure.

With continued reference to FIG. 3, method 300, at step 305, may include the sensor to transmit the plurality of measured aircraft data to the first controller. In a non-limiting embodiment, the first controller and/or a second controller may include a plurality of physical controller area network buses communicatively connected to the aircraft and the sensor. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. In a non-limiting embodiment, the first controller and/or the second controller may receive the plurality of the measured aircraft data sensor by a physical CAN bus unit. In a non-limiting embodiment, the sensor may include a physical CAN bus unit to detect the plurality of measured aircraft data in tandem with a plurality of individual sensors from a sensor suite. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units may be located physically at the aircraft may include mechanical connection to the aircraft, wherein the hardware of the physical CAN bus unit is integrated within the infrastructure of the aircraft.

With continued reference to FIG. 3, method 300, at step 310, includes generating a controller allocation datum as a function of at least the plurality of measured aircraft data. Controller allocation datum may include any controller allocation datum as described herein. In a non-limiting embodiment, first controller may receive the plurality of measured aircraft data and convert the plurality of measured aircraft data into controller allocation datum, wherein first controller may analyze the data surrounding the outside environment, one or more second controllers, one or more flight components associated and/or designated to one second controller, and the like thereof, and generate controller allocation datum which may include individual controller allocation datum uniquely designed for each second controller and/or its associated flight component. For example and without limitation, first controller may detect a malfunctioning flight component and its performance output and generate a controller allocation datum specifically instructing the second controller associated with that malfunctioning flight component to isolate and/or disconnect itself from other second controllers. For example and without limitation, first controller may detect another flight component with greater maximum performance capacity and generate a controller allocation datum that includes a specific controller allocation datum instructing the second controller associated with flight component to increase torque output of the flight component by 30% and in order to alter the angle of attack of the electric aircraft and compensate for the malfunctioning flight component. In a non-limiting embodiment, first controller may detect abnormal behavior of a second controller. For example and without limitation, first controller may be configured to receive constant signals from a second controller and may conclude the second controller is malfunctioning if it fails to transmit a consistent stream of signals. For example and without limitation, first controller may generate a controller allocation datum that includes a specific controller allocation datum instructing the malfunctioning second controller to disconnect itself from its associated flight component and other functioning second controllers. For example and without limitation, the controller allocation datum may include a specific controller allocation datum instructing the other functioning second controllers to disconnect itself from the malfunctioning second controller and instruct one functioning second controller to activate a connection with the flight component associated with the malfunctioning second controller in which the flight component may be commanded by the newly connected second controller. Persons skilled in the art, upon reviewing the entirety of this disclosure, will be aware of the various embodiments of delineating control and instructions as disclosed in the entirety of this disclosure.

With continued reference to FIG. 3, method 300 at step 310, may include generating the controller allocation datum based on a failure response as a function of failure event. The failure response may include any failure response as described herein. The failure event may include any failure event as described herein. In a non-limiting embodiment, first controller may allocate control between second controllers as a function of control allocation datum and failure response. In a non-limiting embodiment, failure event may include a malfunction of a rotor, forward pusher, propeller, battery, and the like thereof. For example and without limitation, failure event may include an instance of a flight component being damaged or detached from the overall body of the electric aircraft during flight. In a non-limiting embodiment, failure response may include a set of instructions of controller allocation datum configured to compensate for instance of failure event 128. For example and without limitation, failure response may include instructions for remaining flight components to adjust its performance output to maintain stable and steady flight of the electric aircraft to compensate for a malfunctioning flight component. In a non-limiting embodiment, failure response may include an output of alerts and/or sirens indicating an emergency situation. In a non-limiting embodiment, failure response 124 may include an automatic transmission of emergency to be received by other entities including an air traffic control. Persons skilled in the art, upon reviewing the entirety of this disclosure, will be aware of the various responses as a trigger of a failure event as disclosed in the entirety of this disclosure.

With continued reference to FIG. 3, step 310 may include generating the failure response as a function of aircraft performance model. is configured to generate aircraft performance model as a function of failure response. The aircraft performance model may include any aircraft performance model as described herein. In a non-limiting embodiment, aircraft performance model may be generated during a flight or after a flight has occurred. For example and without limitation, aircraft performance model may depict the performance of the aircraft and the aircraft actuators in real time as it is flying in the air. In a non-limiting embodiment, aircraft performance model may include a depiction of the flight of the aircraft. In a non-limiting embodiment, aircraft performance model may include a plurality of performance parameters include, but not limited to, aircraft velocity, attitude, actuator torque output, and the like thereof. In a non-limiting embodiment, aircraft performance model may highlight an abnormality of an actuator and a plurality of performance parameters associated with that abnormal actuator. Persons skilled in the art, upon reviewing the entirety of this disclosure, will be aware of the various embodiments of a simulation and/or model in the context of visualization and analysis consistent with this disclosure.

With continued reference to FIG. 1, aircraft performance model 116 may include an expected aircraft performance model. The expected aircraft performance model may include any expected aircraft performance model as described herein. In a non-limiting embodiment, the expected aircraft performance model may include an actuator performance model that depicts a performance model in which none of the actuators are malfunctioning. For example and without limitation, the expected aircraft performance model may be a model depicting a performance of what the aircraft should be based on the ideal, expected, or initial performance the aircraft actuators are intended to perform. For example and without limitation, the expected aircraft performance model includes peak performance output including, but not limited to, power consumption, maximum torque output, cruising torque output, maximum attitude, cruising attitude, maximum velocity, cruising velocity, and the like thereof. For example and without limitation, the expected aircraft performance model may highlight individual performance parameters of each actuator based on a sensor disposed on each actuator. In a non-limiting embodiment, the expected aircraft performance model can be used to assess the performance of the aircraft actuators by comparing the expected aircraft performance model to aircraft performance model and analyzing the difference between the data from the two models. In a non-limiting embodiment, first controller may aircraft performance model the ideal and/or peak performance parameters of an aircraft and its flight components to simulate the expected aircraft performance model based on those ideal and/or peak performance parameters. In a non-limiting embodiment, the expected aircraft performance model may include a plurality of the expected aircraft performance model depicting a different failure modes of an aircraft and/or an aircraft's actuators. For example and without limitation, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. The aircraft performance model 116 may be generated as a function of a flight simulator. The flight simulator may include any flight simulator as described herein. The aircraft performance model may include electric aircraft virtual representation. The virtual representation may include any virtual representation as described herein. Persons skilled in the art, upon reviewing the entirety of this disclosure, will be aware of the various models and comparisons consistent with this disclosure.

With continued reference to FIG. 3, step 310 may include generating the controller allocation datum as a function of identifying a defunct component. The defunct component may include any defunct component as described herein. In a non-limiting embodiment, the defunct component may include any electrical component that may produce abnormal outputs. For example and without limitation, the defunct component may include a defunct rotor that may output a torque of 1.5 Newton-metre (Nm) while the remaining rotors may output a torque of 3.6 Nm. In a non-limiting embodiment, actuators may include different failure modes which are represented by various expected actuator performance model. For example, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. In a non-limiting embodiment, the first controller may compare the aircraft performance model with an expected actuator performance model to identify a defunct component. For example and without limitation, first controller may sort models based on their expected metrics and select the model that has expected metrics that closely match actual or observed metrics. In one example, the metrics compared include attitude and rates of change in attitude of the aircraft. In some embodiments, the first controller may compares observed metrics of the aircraft to expected metrics of the aircraft in an operable mode (e.g. no actuator failures associated with a "no failure" model). In a non-limiting embodiment, first controller 112 may receive from a flight simulator, a plurality of expected actuator performance model which may include a model for every possible failure mode. A "failure mode," for the purpose of this disclosure, is any state of the electric aircraft in which one or more actuators are defunct, malfunctioning, or failing. For example and without limitation, in an aircraft comprising four rotors, a model is determined for a first rotor failure, a second rotor failure, a third rotor failure, a fourth rotor failure, a first and second rotor failure, a first and third rotor failure, a first and fourth rotor failure, a second and third rotor failure, and a second and fourth rotor failure. Multiple additional models may be determined including a model for no rotor failure and all rotor failure in addition to a first, second, and third rotor failure and a second, third, and fourth rotor failure. In some embodiments, the number of models determined is equal to the number of actuators squared plus one. In some embodiments, the number of considered failure modes is less than the total possible failure modes. For example, models may not be determined for less likely failure modes in order to limit computations performed. Persons skilled in the art, upon reviewing the entirety of this disclosure, will be aware of various embodiments of failure modes used to identify the defunct component consistent with this disclosure. In a non-limiting embodiment, the plurality of expected actuator performance model may be sorted based on similarity to an observed flight datum. For example, an expected flight datum including expected attitude and expected attitude rate given a failure mode is determined or otherwise generated based on and/or for each model. In some embodiments, the models are sorted based on how closely their corresponding expected attitude and expected attitude rate matches the observed attitude and attitude rate. The sorted models may result in a sorted list of failure modes from most likely to least likely. For example, in the event a first rotor failure mode has a corresponding expected attitude that is 0.2 off from the observed attitude and an expected attitude rate that is 0.1 off from the observed attitude rate whereas a second rotor failure mode has a corresponding expected attitude that is 0.7 off from the observed attitude and an expected attitude rate that is 0.9 off from the observed attitude, the first rotor failure is determined to be more likely than the second rotor failure mode. In some embodiments, the summation of the difference between expected attitude and observed attitude and the difference between expected attitude rate and observed attitude rate is used to sort the models. In some embodiments, expected attitude is weighted more than expected attitude rate or vice versa. A model's similarity to observed metrics may be determined using various calculations based on the expected and observed values in various embodiments. In a non-limiting embodiment, the first controller may identify the defunct component, or one or more defunct components based on the sorted model. For example, the failure mode top of the sorted list may be selected. Flight components failures that correspond to the failure mode are determined to be in effect.

With continued reference to FIG. 3, method 300, at step 310, may include generating the controller allocation datum as a function of a machine-learning algorithm. The machine-learning algorithm may include any machine-learning algorithm as described herein. In a non-limiting embodiment, the first controller may be configured to select a training set as a function of each measured aircraft data of the plurality of measured aircraft data, wherein each measured aircraft data is correlated to an element of modeled aircraft data. The element of modeled aircraft data may include any element of modeled aircraft data as described herein. Training set may include a measured aircraft data correlated to a model denoting a malfunction of a second controller. Training set may include a measured aircraft data correlated to a model denoting a malfunction of a flight component. First controller may be further configured to generate, using a machine-learning algorithm, control allocation datum based on the plurality of measured aircraft data and selected training set.

With continued reference to FIG. 3, method 300, at step 315, includes receiving, by a second controller of a plurality of second controllers, the controller allocation datum from the first controller. The second controller may include any second controller as described herein. Receiving may include the first controller to transmit the controller allocation datum to the second controller of a plurality of second controllers.

With continued reference to FIG. 3, method 300, at step 320, includes generating a command allocation as a function of the controller allocation datum and the aircraft component datum. In a non-limiting embodiment, the allocation command may include a specific instruction set from the controller allocation datum which may instruct the second controller associated with the flight component to increase torque output of the flight component by 30% and in order to alter the angle of attack of the electric aircraft and compensate for the malfunctioning flight component. In a non-limiting embodiment, a second controller may generate allocation command 136 that includes a specific set of instructions that instruct the second controller to disconnect itself from its associated flight component and other functioning second controllers in the instant the second controller is deemed to be malfunctioning. For example and without limitation, the allocation command may include a specific set of instructions that instruct the second controller to disconnect itself from a malfunctioning second controller and activate a connection with the flight component associated with the malfunctioning second controller in which the flight component may be commanded by the newly connected second controller. Persons skilled in the art, upon reviewing the entirety of this disclosure, will be aware of the various embodiments of delineating control and instructions as disclosed in the entirety of this disclosure.

With continued reference to FIG. method 300, at step 325, includes providing the command allocation to each flight component of the plurality of flight components. Providing the command allocation may include commanding as a function of a torque allocation. Torque allocation may include any torque allocation as described herein.

Figure 4:
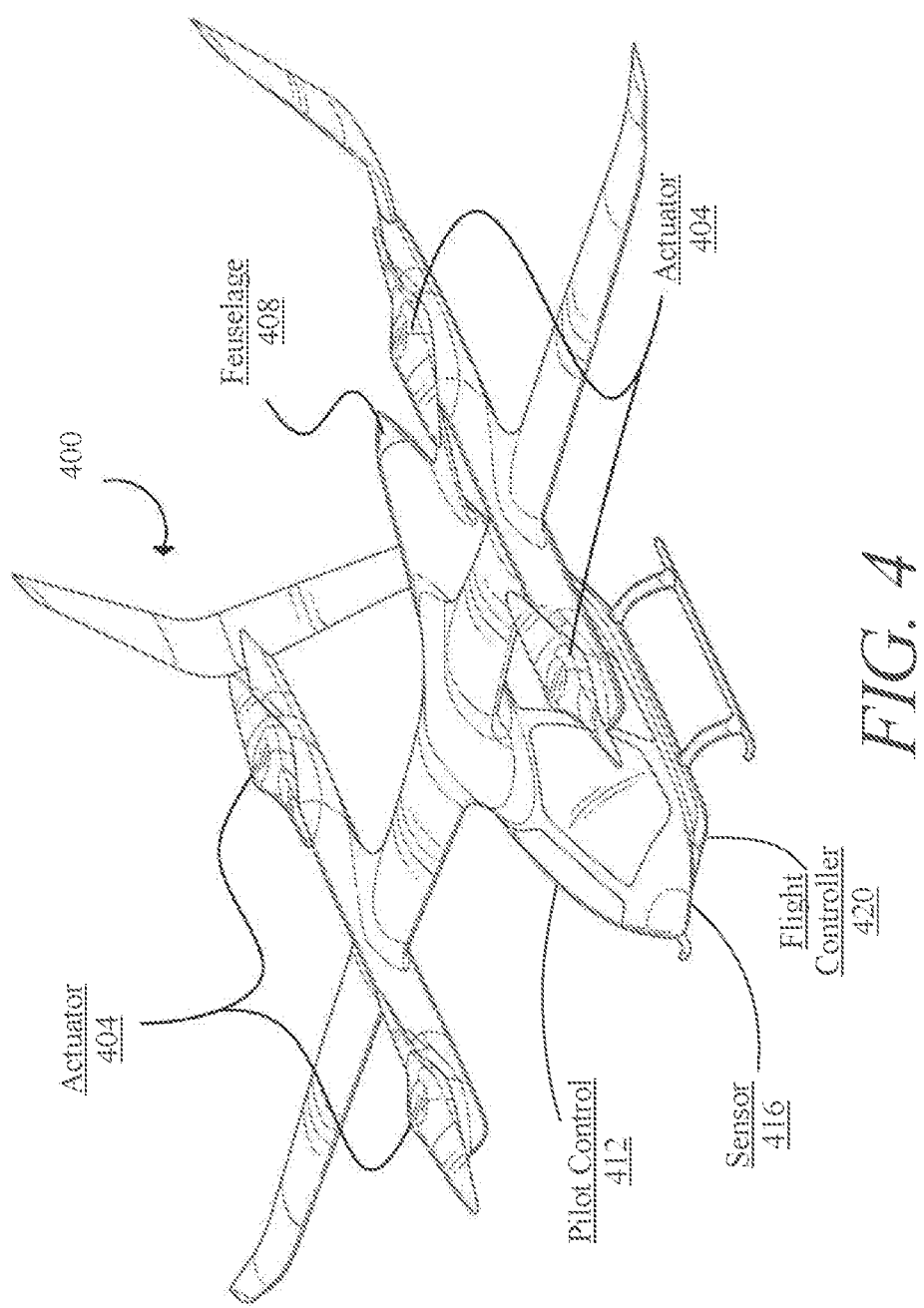
FIG. 4 is an illustrative embodiment of an electric aircraft.

Referring now to FIG. 4, an exemplary embodiment of an aircraft 400, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 4, aircraft 400 may include an electrically powered aircraft. In embodiments, electrically powered aircraft may be an electric vertical takeoff and landing (eVTOL) aircraft. Aircraft 400 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 4.

Still referring to FIG. 4, aircraft 400 includes a fuselage 404. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 404 may include structural elements that physically support a shape and structure of an aircraft. Structural elements may take a plurality of forms, alone or in combination with other types. Structural elements may vary depending on a construction type of aircraft such as without limitation a fuselage 404. Fuselage 404 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 4, aircraft fuselage 404 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 404 orthogonal to a longitudinal (nose to tail) axis of the aircraft and may form a general shape of fuselage 404. A former may include differing cross-sectional shapes at differing locations along fuselage 404, as the former is the structural element that informs the overall shape of a fuselage 404 curvature. In embodiments, aircraft skin may be anchored to formers and strings such that the outer mold line of a volume encapsulated by formers and stringers comprises the same shape as aircraft 400 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 4, fuselage 404 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 4, fuselage 404 may include a semi-monocoque construction. Semi-monocoque construction, as used herein, is a partial monocoque construction, wherein a monocoque construction is describe above detail. In semi-monocoque construction, aircraft fuselage 404 may derive some structural support from stressed aircraft skin and some structural support from underlying frame structure made of structural elements. Formers or station frames can be seen running transverse to the long axis of fuselage 404 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 4, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 4, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 404. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 4, it should be noted that an illustrative embodiment is presented only, and this disclosure in no way limits the form or construction method of a system and method for loading payload into an eVTOL aircraft. In embodiments, fuselage 404 may be configurable based on the needs of the eVTOL per specific mission or objective. The general arrangement of components, structural elements, and hardware associated with storing and/or moving a payload may be added or removed from fuselage 404 as needed, whether it is stowed manually, automatedly, or removed by personnel altogether. Fuselage 404 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 404 may also be configurable to accept certain specific cargo containers, or a receptacle that can, in turn, accept certain cargo containers.

Still referring to FIG. 4, aircraft 400 may include a plurality of laterally extending elements attached to fuselage 404. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 4, aircraft 400 includes a plurality of flight components 408. As used in this disclosure a "flight component" is a component that promotes flight and guidance of an aircraft. In an embodiment, flight component 408 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 4, plurality of flight components 408 may include at least a lift propulsor component 412. As used in this disclosure a "lift propulsor component" is a component and/or device used to propel a craft upward by exerting downward force on a fluid medium, which may include a gaseous medium such as air or a liquid medium such as water. Lift propulsor component 412 may include any device or component that consumes electrical power on demand to propel an electric aircraft in a direction or other vehicle while on ground or in-flight. For example, and without limitation, lift propulsor component 412 may include a rotor, propeller, paddle wheel and the like thereof, wherein a rotor is a component that produces torque along the longitudinal axis, and a propeller produces torquer along the vertical axis. In an embodiment, lift propulsor component 412 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 412 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 4.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 4, lift propulsor component 412 may be configured to produce a lift. As used in this disclosure a "lift" is a perpendicular force to the oncoming flow direction of fluid surrounding the surface. For example, and without limitation relative air speed may be horizontal to aircraft 400, wherein lift force may be a force exerted in a vertical direction, directing aircraft 400 upwards. In an embodiment, and without limitation, lift propulsor component 412 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 412 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 4, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 400 may be incorporated.

In an embodiment, and still referring to FIG. 4, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 4, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 4, plurality of flight components 408 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 45° from the longitudinal axis of aircraft 400. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 4, plurality of flight components 408 may include a pusher component 416. As used in this disclosure a "pusher component" is a component that pushes and/or thrusts an aircraft through a medium. As a non-limiting example, pusher component 416 may include a pusher propeller, a paddle wheel, a pusher motor, a pusher propulsor, and the like. Additionally, or alternatively, pusher flight component may include a plurality of pusher flight components. Pusher component 416 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 400 in a horizontal direction along a longitudinal axis. As a further non-limiting example, pusher component 416 may twist and/or rotate to pull air behind it and, at the same time, push aircraft 400 forward with an equal amount of force. In an embodiment, and without limitation, the more air forced behind aircraft, the greater the thrust force with which the aircraft is pushed horizontally will be. In another embodiment, and without limitation, forward thrust may force aircraft 400 through the medium of relative air. Additionally or alternatively, plurality of flight components 408 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 4, aircraft 400 may include a flight controller located within fuselage 404, wherein a flight controller is described in detail below, in reference to FIG. 4. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 100 and one or more airfoil shapes of the laterally extending elements, wherein an airfoil is described above in detail. As a further non-limiting example, flight controller may operate the fixed-wing flight capability as a function of reducing applied torque on lift propulsor component 412. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 416. For example, and without limitation, flight controller may increase a forward thrust of 400 kN produced by pusher component 416 to a forward thrust of 1669 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 400. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 4, flight controller may be configured to perform a reverse thrust command. As used in this disclosure a "reverse thrust command" is a command to perform a thrust that forces a medium towards the relative air opposing aircraft 190. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 4, flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 5:
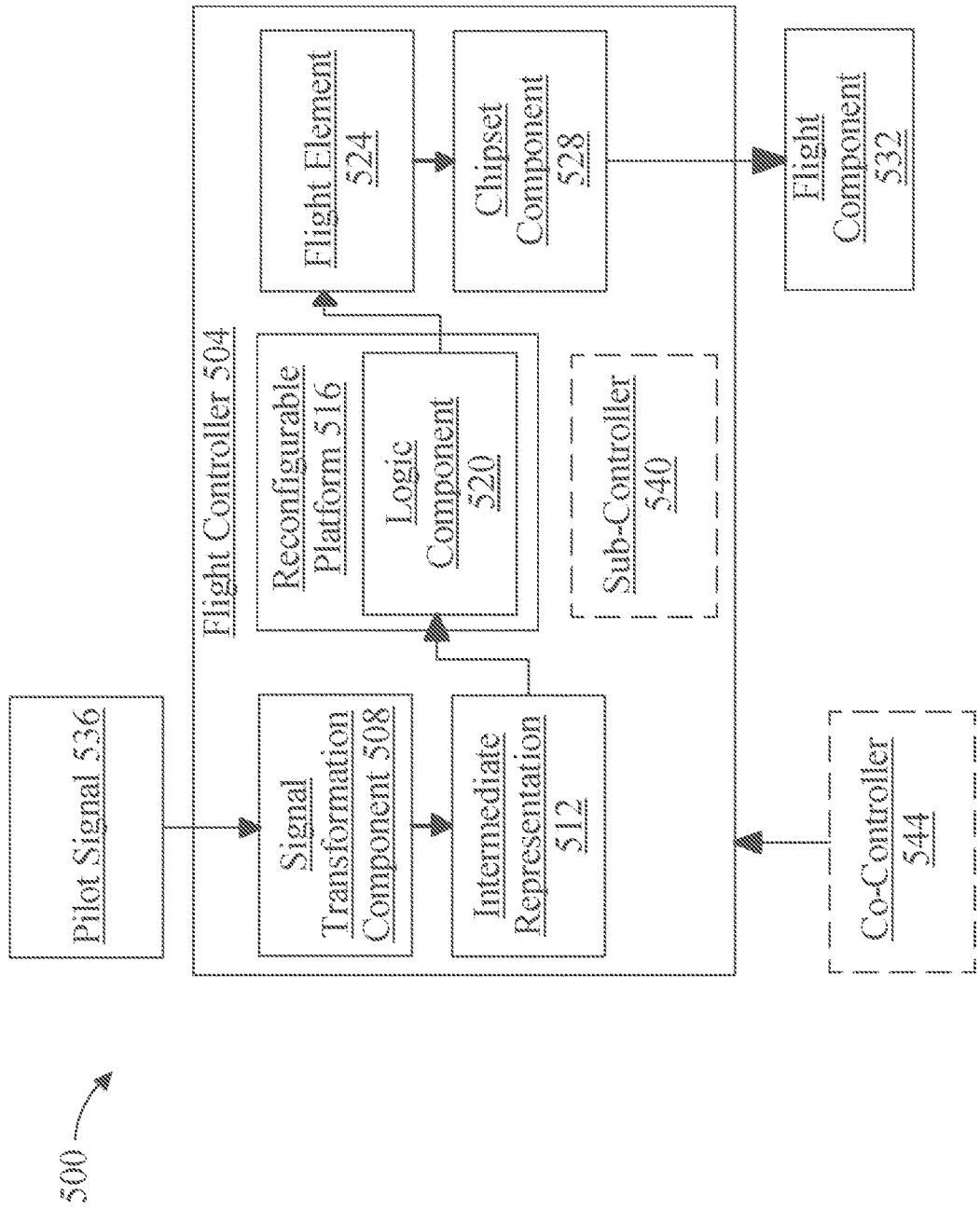
FIG. 5 is a block diagram illustrating a flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 19-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for providing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component. As used in this disclosure a "flight component" is a portion of an aircraft that can be moved or adjusted to affect one or more flight elements. For example, flight component may include a component used to affect the aircrafts' roll and pitch which may comprise one or more ailerons. As a further example, flight component may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity.

In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously providing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
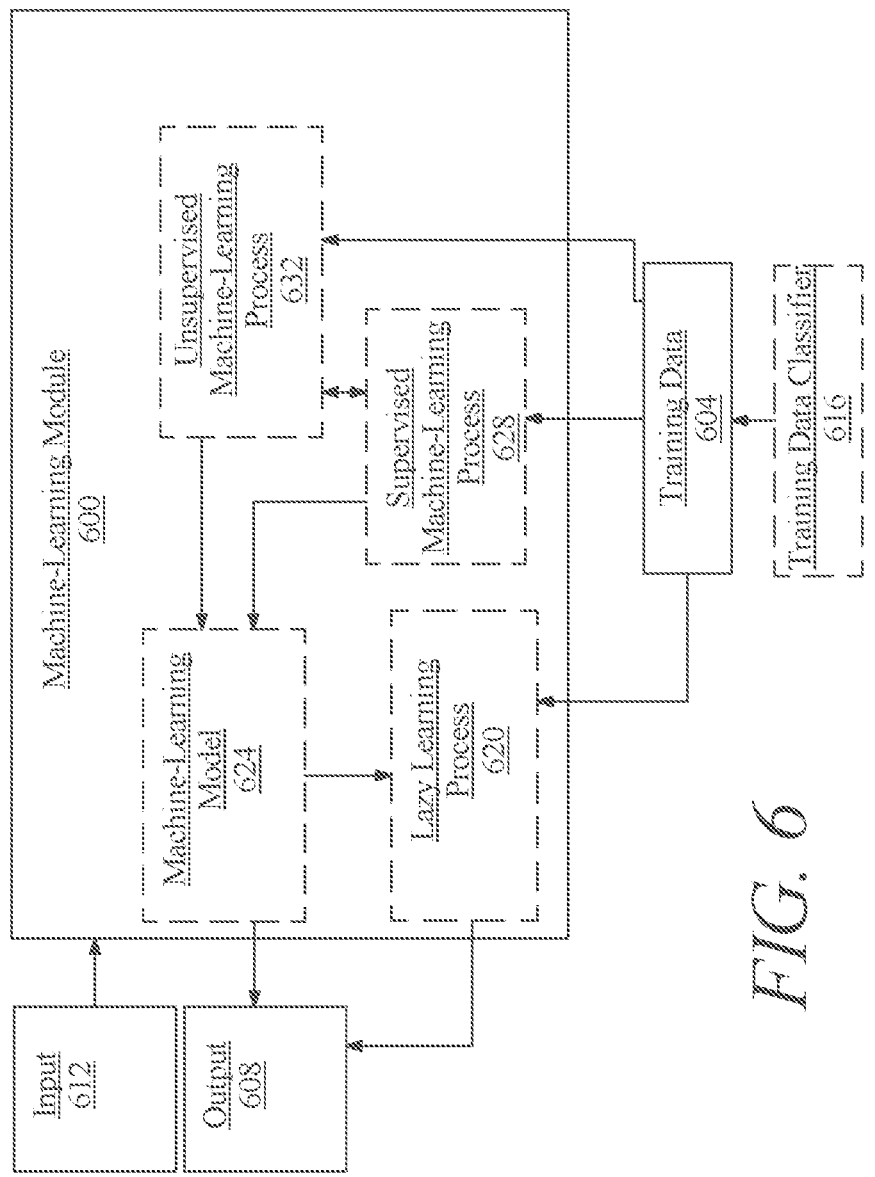
FIG. 6 is block diagram of an exemplary embodiment of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example, inputs may include the plurality of measured aircraft data, an input datum, and an aircraft performance model and an output may include a controller allocation datum. In a non-limiting embodiment, the controller allocation datum may be in input for an allocation command output.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to different models embodying failure responses, failure events, and the like thereof, for which a subset of training data may be selected.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the plurality of measured aircraft data, aircraft performance model, and failure response as inputs, a controller allocation datum as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
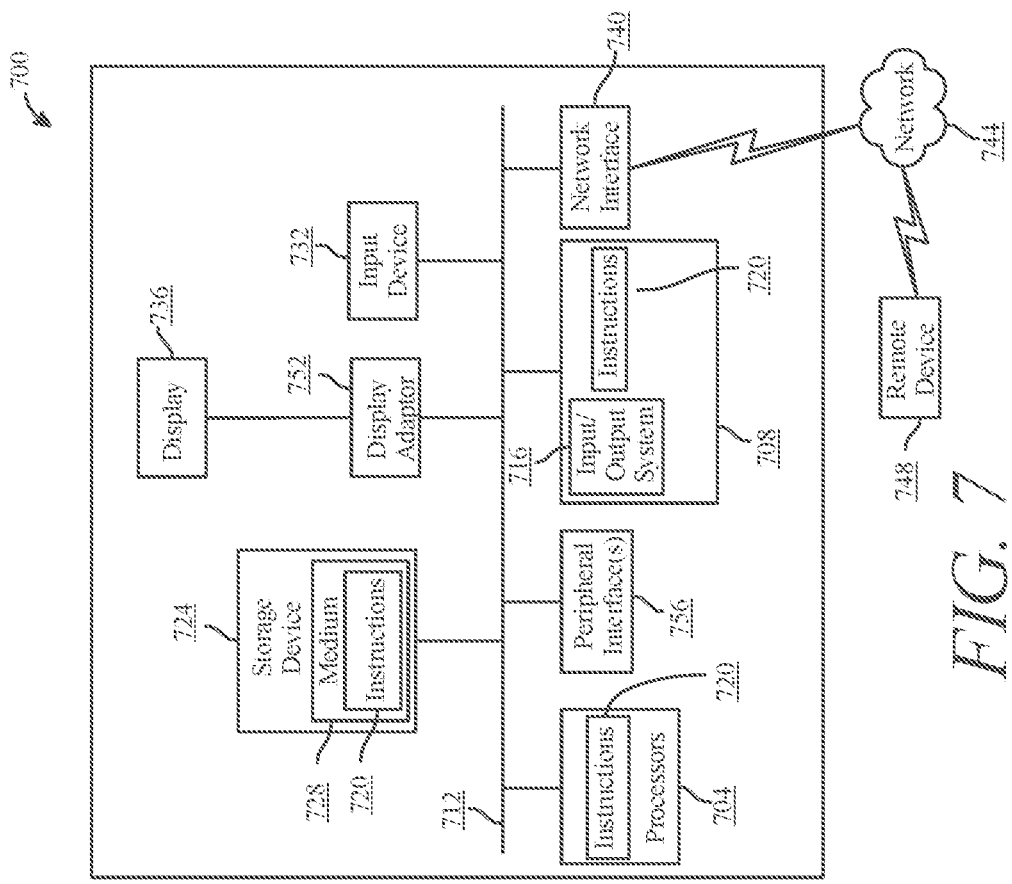
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for providing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for distributed flight controllers for an electric aircraft, the system comprising:
   a plurality of flight components coupled to an electric aircraft;
   a first controller coupled to the electric aircraft, wherein the first controller is configured to:
      receive a plurality of measured aircraft data;
      generate a controller allocation datum as a function of at least the plurality of measured aircraft data;
      receive updated aircraft data including data on a defunct second controller of the electric aircraft; and
      modify the controller allocation datum by generating an updated controller allocation datum as a function of the updated aircraft data; and
   a plurality of second controllers including the defunct second controller, wherein each second controller is associated with a respective flight component of the plurality of flight components, wherein the plurality of second controllers is configured to:
      receive the updated controller allocation datum from the first controller;
      generate an allocation command as a function of the updated controller allocation datum, wherein the allocation command comprises a torque allocation command; and
   provide the torque allocation command to each respective flight component of the plurality of flight components, wherein providing the torque allocation command further comprises:
      communicatively disconnecting the defunct second controller from the remaining second controllers of the plurality of second controllers; and
      controlling, directly and independently of the defunct second controller, torque output of the flight component associated with the defunct second controller by at least one of the remaining second controllers.

2. The system of claim 1, wherein the plurality of measured aircraft data further comprises an input datum.

3. The system of claim 1, wherein the system further comprises a sensor, wherein the sensor is configured to transmit the plurality of measured aircraft data to the first controller.

4. The system of claim 1, wherein the controller allocation datum further comprises a failure response as a function of a failure event.

5. The system of claim 4, wherein the first controller is further configured to generate the failure response as a function of at least an aircraft performance model.

6. The system of claim 4, wherein the first controller is further configured to allocate control between the plurality of second controllers as a function of the control allocation datum and at least the failure response.

7. The system of claim 1, wherein the first controller is further configured to:
   store the plurality of measured aircraft data in a database;
   store the controller allocation datum in the database; and
   store the aircraft performance model in the database.

8. The system of claim 1, wherein the first controller is further configured to generate a machine-learning model, wherein the machine-learning model is configured to receive the plurality of measured aircraft data as an input and output the controller allocation datum as a function of training data.

9. The system of claim 1, wherein the controller allocation datum further comprises a failure response as a function of a failure event, wherein the failure event includes a malfunction of a flight component of the plurality of flight components, wherein the failure response includes at least an instruction of the controller allocation datum configured to compensate for the failure event.

10. The system of claim 9, wherein the failure response further comprises at least an instruction for remaining flight components to adjust torque output to maintain stable and steady flight of the electric aircraft to compensate for the malfunctioning flight component.

11. A method for distributed flight controllers for an electric aircraft, the method comprising:
   receiving, by a first controller coupled to an electric aircraft, a plurality of measured aircraft data;
   generating, by the first controller, a controller allocation datum as a function of at least the plurality of measured aircraft data;
   receiving, by the first controller, updated aircraft data including data on a defunct second controller of the electric aircraft; and
   modifying, by the first controller, the controller allocation datum by generating an updated controller allocation datum as a function of the updated aircraft data;
   receiving, by a plurality of second controllers including the defunct second controller, the updated controller allocation datum from the first controller, wherein each second controller is associated with a respective flight component of a plurality of flight components of the electric aircraft;
   generating an allocation command as a function of the updated controller allocation datum, wherein the allocation command comprises a torque allocation command; and
   providing the torque allocation command to each respective flight component of the plurality of flight components, wherein providing the torque allocation command further comprises:
      communicatively disconnecting the defunct second controller from the remaining second controllers of the plurality of second controllers; and
      controlling, directly and independently of the defunct second controller, torque output of the flight component associated with the defunct second controller by at least one of the remaining second controllers.

12. The method of claim 11, wherein receiving the plurality of measured aircraft data further comprises receiving an input datum.

13. The method of claim 11, wherein the method further comprises transmitting the plurality of measured aircraft data to the first controller by a sensor.

14. The method of claim 11, wherein generating the controller allocation datum further comprises generating a failure response as a function of a failure event.

15. The method of claim 14, wherein generating the failure response further comprises generating the failure response as a function of at least an aircraft performance model.

16. The method of claim 14, wherein the method further comprises allocating, by the first controller, control between the plurality of second controllers as a function of the control allocation datum and at least the failure response.

17. The method of claim 11, wherein the method further comprises:
   storing, by the first controller, the plurality of measured aircraft data in a database;
   storing the controller allocation datum in the database; and
   storing the aircraft performance model in the database.

18. The method of claim 11, wherein generating the controller allocation datum further comprises generating a machine-learning model, wherein the machine-learning model is configured to receive the plurality of measured aircraft data as an input and output the controller allocation datum as a function of training data.

19. The method of claim 11, wherein the controller allocation datum further comprises a failure response as a function of a failure event, wherein the failure event includes a malfunction of a flight component of the plurality of flight components, wherein the failure response includes at least an instruction of the controller allocation datum configured to compensate for the failure event.

20. The method of claim 19, wherein the failure response further comprises at least an instruction for remaining flight components to adjust torque output to maintain stable and steady flight of the electric aircraft to compensate for the malfunctioning flight component.

* * * * *